US006987083B2

(12) United States Patent
Phillippi et al.

(10) Patent No.: US 6,987,083 B2
(45) Date of Patent: Jan. 17, 2006

(54) XANTHAN GELS IN BRINES AND METHODS OF USING SUCH XANTHAN GELS IN SUBTERRANEAN FORMATIONS

(75) Inventors: Max L. Phillippi, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/411,764

(22) Filed: Apr. 11, 2003

(65) Prior Publication Data

US 2004/0206498 A1  Oct. 21, 2004

(51) Int. Cl.
  *E21B 43/04*  (2006.01)
(52) U.S. Cl. ............ 507/213; 166/278; 166/303; 507/241; 507/260; 507/276; 507/277
(58) Field of Classification Search ......... 166/276, 166/278, 285, 292–294, 300, 302, 303, 305.1; 507/213, 241, 260, 276, 277
See application file for complete search history.

(56) References Cited

U.S. PATENT DOCUMENTS

| | | | | |
|---|---|---|---|---|
| 4,186,803 A | * | 2/1980 | Mondshine | 166/292 |
| 4,466,889 A | | 8/1984 | Miller et al. | 252/8.55 D |
| 5,054,552 A | | 10/1991 | Hall et al. | 16/278 |
| 5,211,859 A | | 5/1993 | Horton et al. | 252/8.551 |
| 5,728,825 A | | 3/1998 | Wong | 536/114 |
| 6,110,875 A | * | 8/2000 | Tjon-Joe-Pin et al. | 507/201 |
| 6,631,761 B2 | * | 10/2003 | Yuan et al. | 166/248 |
| 6,631,764 B2 | * | 10/2003 | Parlar et al. | 166/278 |

OTHER PUBLICATIONS

Foreign communication from a related counterpart application dated Aug. 30, 2004.

* cited by examiner

*Primary Examiner*—Zakiya Walker
(74) *Attorney, Agent, or Firm*—Robert A. Kent; Baker Botts

(57) ABSTRACT

Xanthan gels hydratable in brine, methods of making these xanthan gels, and methods of using these compositions in subterranean formation applications, such as gravel packing, are provided herein.

211 Claims, No Drawings

XANTHAN GELS IN BRINES AND METHODS OF USING SUCH XANTHAN GELS IN SUBTERRANEAN FORMATIONS

BACKGROUND OF THE INVENTION

1. Field of the Invention

The present invention relates to high viscosity fluids used in industrial and oil field operations, and more particularly, to high viscosity fluids comprising xanthan gels and their use in industrial and oil field operations.

2. Description of the Prior Art

In industrial and oil field applications, there are several uses for high viscosity fluids as such fluids have a greater propensity to keep soluble particulate matter suspended therein. An example of an oil field application wherein high viscosity fluids are used is gravel packing. In gravel packing, a screen, slotted liner or other mechanical device is placed into a well bore. The well bore may comprise an open hole or a cased hole, e.g., a well bore having an internal liner. A high viscosity fluid, e.g., a gel, and suspended particles are then placed into the annulus between the mechanical device and the formation or casing. The gel is charged with maintaining its viscosity until the gravel packing operation is completed, after which the gel is "broken" to reclaim it from the annulus, and from the subterranean formation. Having broken, the gel is then produced up the well bore.

As referred to herein, the "breaking" of a gravel packing fluid will be understood to mean an intentional reduction in the viscosity of a gravel packing fluid. In a number of embodiments, a gravel pack fluid generally comprises at least a particulate or gravel suspended in a brine. As referred to herein, the term "gravel" will be understood to mean a sand or other proppant of a size that is sufficiently large to prevent migration of formation grains, and to maintain the maximum sand pack permeability, but sufficiently small to not negatively affect permeability and prevent smaller formation grains from passing through the gravel pack. As referred to herein, the term "brine" will be understood to mean a solution of water mixed with any salt.

Generally speaking, a gravel pack may be used when petroleum products are produced from poorly consolidated subterranean formations, wherein subterranean particulate matter may loosen from the formation and flow into the wellbore. Such behavior is commonly referred to as "sand migration." Sand migration is especially problematic because the migrating sand may eventually, inter alia, erode downhole and surface production equipment, restrict subterranean pathways through which formation fluids are produced, and in extreme cases, completely interrupt production. A remedy commonly employed in such cases is the placement of a screen, slotted liner or other mechanical device into the well bore across the desired section of unconsolidated formation, with the gravel then packed into the annulus created between the formation and the mechanical device.

The use of xanthan gels as gravel pack fluids is problematic, however, because of, inter alia, the difficulty in hydrating the xanthan polymer in the presence of a salt brine. As referred to herein, "hydrating the xanthan polymer" will be understood to mean contacting the xanthan polymer with water in order to, inter alia, unravel and fully extend the xanthan polymer chain. Hydration of the xanthan polymer is important because, inter alia, improper hydration will impair development of viscosity of the gel, which may cause the resulting fine particulate matter to damage the permeability of the formation. Traditional attempts to hydrate the xanthan polymer have consisted of introducing xanthan polymer to fresh water, fully hydrating the xanthan polymer, and then adding one or more salts, followed by strenuous shearing of the mixture. Hydration of xanthan in fresh water is not usually problematic. However, in certain applications, hydration of xanthan polymer is desirably carried out in a brine. Such hydration in brine has been found to be problematic at ambient temperature, and may only be achieved through the use of time-consumptive, excessive shearing. However, this method of hydrating the xanthan polymer at ambient temperature, through such excessive shearing, is problematic because the resulting xanthan gel cannot be filtered practically through filters in standard industrial use, e.g., 0.5–20 microns. The subterranean use of a xanthan gel that cannot be filtered through a such filters is problematic, because such xanthan gel, once placed in a formation, will tend to be difficult to fully reclaim from the formation, e.g., the gel will tend to obstruct permeability of the formation.

SUMMARY OF THE INVENTION

The present invention provides improved xanthan compositions, methods of making these compositions, and methods of using these compositions in subterranean formation applications, such as gravel packing.

A method of the present invention comprises the steps of providing a brine comprising water and a salt, heating the brine, depressing the pH of the brine, adding xanthan polymer to the brine to form a mixture, elevating the pH of the mixture, and mixing the mixture. Another method of the present invention comprises the steps of providing a brine comprising water and a salt, depressing the pH of the brine, adding xanthan polymer to the brine to form a mixture, elevating the pH of the mixture, and mixing the mixture through a form of mixing that imparts a sufficient quantity of heat to the mixture to hydrate the mixture to a desired level.

One embodiment of the xanthan gels of the present invention involves the addition of xanthan polymer to a heated brine solution. Optionally, other additives such as bactericides, surfactants and the like may be added to the xanthan gels of the present invention.

The objects, features and advantages of the present invention will be readily apparent to those skilled in the art upon a reading of the description of the preferred embodiments which follows.

DESCRIPTION OF PREFERRED EMBODIMENTS

The present invention provides xanthan gels hydratable in brine, methods of making these xanthan gels, and methods of using these compositions in subterranean formation applications, such as gravel packing.

The xanthan gels of the present invention generally comprise water, a salt, xanthan, a pH suppressant, and a base. The pH suppressant may comprise a chelating agent, an acid, or a combination of a chelating agent and an acid. Other additives, including, for example, surfactants and bactericides, optionally may be added if desired.

The xanthan gels of the present invention may vary widely in density. One of ordinary skill in the art with the benefit of this disclosure will recognize the particular density that is most appropriate for a particular application. The density of the xanthan gels of the present invention may range from about 8.4 pounds per gallon ("ppg") to about 20.5 ppg. The desired density for a particular xanthan gel may depend, inter alia, on characteristics of the subterranean formation, including, inter alia, the hydrostatic pressure required to control the fluids of the subterranean formation during placement of the xanthan gel, and the hydrostatic pressure which will damage the subterranean formation. Because the xanthan gel comprises, inter alia, xanthan polymer added to a brine having a particular density, the density of this base brine relates to the density of the xanthan gel. For example, if a light weight xanthan gel is desired, a light weight brine may be prepared; if a heavier xanthan gel is desired, a heavier brine may be prepared.

The water used in the xanthan gels of the present invention generally comprises fresh water. Other water sources may be used, including those comprising divalent or trivalent cations, e.g., magnesium, calcium, iron, which cations may in some concentrations cause undesirable crosslinking of the xanthan polymer. If a water source is used which contains such divalent or trivalent cations in concentrations sufficiently high to be problematic, then such divalent or trivalent salts may be removed, either by a process such as reverse osmosis, or by raising the pH of the water in order to precipitate out such divalent salts to lower the concentration of such salts in the water before the water is used. Monovalent brines are suitable and, where used, may be of any weight. Salts may be added to the water source, inter alia, to provide a brine, and a resulting xanthan gel, having a desired density.

Salts may be used in the xanthan gels of the present invention. One of ordinary skill in the art with the benefit of this disclosure will recognize the particular type of salt appropriate for a particular application, given considerations such as, inter alia, protection of the formation, the presence or absence of reactive clays in the formation adjacent to the well bore, and the factors affecting wellhead control. A wide variety of salts are suitable for inclusion in the xanthan gels of the present invention. Examples of suitable salts include, inter alia, potassium chloride, sodium bromide, ammonium chloride, cesium formate, potassium formate, sodium formate, sodium nitrate, and sodium chloride. An artisan of ordinary skill with the benefit of this disclosure will recognize the appropriate concentration of a particular salt to achieve a desired density given factors such as, inter alia, the environmental regulations that may pertain to the application. Also, the composition of the water used in the xanthan gel also will dictate whether and what type salt is appropriate.

The xanthan gels of the present invention comprise xanthan polymer. Preferably, the xanthan polymer used is of high purity. One of ordinary skill in the art with the benefit of this disclosure will recognize the grade of purity of xanthan polymer appropriate for a particular application. An example of a suitable source of xanthan polymer is commercially available from Kelco Oil Field Group, of Houston, Tex., under the tradename "XANVIS L." An example of another suitable source of xanthan polymer is commercially available from Halliburton Energy Services, Inc., of Duncan, Okla., under the tradename "WG-24."

The xanthan gels of the present invention further comprise a pH suppressant. The pH suppressant may comprise a chelating agent, an acid, or a combination of a chelating agent and an acid, in order to, inter alia, drop the pH of the brine so as to improve the dispersion of xanthan polymer upon addition of the xanthan polymer to the brine. Generally, to achieve some of the beneficial effects of the present invention, the pH suppressant is used to drop the pH to a pH in the range of about 1 to about 6.

In one embodiment, the pH suppressant is a chelating agent. Where added to the xanthan gels of the present invention, a chelating agent may, inter alia, chelate any dissolved iron that may be present in the water. Such chelating, inter alia, prevents free iron from crosslinking the xanthan polymer. Crosslinking of xanthan polymer is problematic because, inter alia, it may cause severe filtration problems. Any suitable chelating agent may be used with the xanthan gels of the present invention. One of ordinary skill in the art with the benefit of this disclosure will recognize what, if any, chelating agent is appropriate for a particular application. Examples of suitable chelating agents include an anhydrous form of citric acid, commercially available under the tradename "FE-2" from Halliburton Energy Services, Inc., of Duncan, Okla. Another example of a suitable chelating agent is a solution of citric acid dissolved in water, commercially available under the tradename "FE-2A" from Halliburton Energy Services, Inc., of Duncan, Okla. Other chelating agents which are suitable for use with the present invention include, inter alia, nitrilotriacetic acid and any acid form of ethylene diamine tetracetic acid ("EDTA"). Generally, the chelating agent is present in the brine in an amount sufficient to prevent crosslinking of the xanthan polymer by any free iron that may be present in the brine. In one embodiment, the chelating agent is present in the xanthan gel in an amount of from about 0.02% to about 2.0% by weight of the xanthan gel. In another embodiment, the chelating agent is present in the xanthan gel in an amount in the range of from about 0.02% to about 0.5% by weight of the xanthan gel. One of ordinary skill in the art with the benefit of this disclosure will be able to determine the proper concentration of chelating agents for a particular application.

In another embodiment, the pH suppressant is an acid. One of ordinary skill in the art with the benefit of this disclosure will recognize the type and the quantity of acids which may be used to achieve the desired pH reduction of the brine. Any known acid may be suitable with the xanthan gels of the present invention. Examples of suitable acids include, inter alia, hydrochloric acid, acetic acid, formic acid and citric acid.

In still another embodiment, the pH suppressant comprises a combination of an acid and a chelating agent. Such combination may be suitable when, inter alia, the addition of a chelating agent (in an amount sufficient to chelate the iron present in the brine) is insufficient by itself to achieve the desired reduction of the pH of the brine.

The xanthan gels of the present invention also comprise a base, inter alia, to elevate the pH of the mixture that is formed once the xanthan polymer has been added to and dispersed within the brine. It is desirable to elevate the pH of the mixture, inter alia, because hydration of the xanthan polymer occurs more rapidly at an elevated pH. Generally, a base is used to elevate the pH of the mixture to greater than about 7. In one embodiment, the base is used to elevate the pH of the mixture to greater than about 10. Any known base can be used in the xanthan gels of the present invention. Examples of a suitable base include, inter alia, sodium hydroxide, potassium carbonate, potassium hydroxide and sodium carbonate. An example of a suitable base is a solution of 25% sodium hydroxide commercially available from Halliburton Energy Services, Inc., of Duncan, Okla., under the tradename "MO-67." One of ordinary skill in the art with the benefit of this disclosure will recognize the types of bases which may be used to achieve this pH elevation.

The xanthan gels of the present invention may optionally include, inter alia, surfactants, to improve the compatibility of the xanthan gels of the present invention with other fluids, including, inter alia, any formation fluids or fluids present in the well bore. An artisan of ordinary skill with the benefit of this disclosure will be able to identify the type of surfactant appropriate to improve the compatibility of a particular xanthan gel with a particular type of fluid, as well as the appropriate concentration of surfactant to be used. The surfactant may be a liquid or powder. Where used, the surfactants are present in the xanthan gel in an amount sufficient to prevent incompatibility with formation fluids or well bore fluids. Where liquid surfactants are used, the surfactants are generally present in the xanthan gels of the present invention in an amount in the range of from about 0.01% to about 5.0% by volume of the xanthan gel. In one embodiment, the liquid surfactants are present in the xanthan gel in an amount in the range of from about 0.1% to about 2.0% by volume. Where powdered surfactants are used, the surfactants may be present in the xanthan gel in an amount in the range of from about 0.001% to about 0.5% by weight of the xanthan gel. Examples of suitable surfactants are non-emulsifiers commercially available from Halliburton Energy Services, Inc., of Duncan, Okla., under the tradenames "LOSURF-259™," "LOSURF-300™," "LOSURF-357™," and "LOSURF-400™." Another example of a suitable surfactant is a non-emulsifier commercially available from Halliburton Energy Services, Inc., of Duncan, Okla., under the tradename "NEA-96M."

The xanthan gels of the present invention may optionally contain bactericides, inter alia, to protect both the subterranean formation as well as the xanthan gel from attack by bacteria which may be present in the brine. Attack by bacteria on the xanthan gel is problematic because such attack, when successful, may lower the viscosity of the xanthan gel, resulting, inter alia, in poorer well bore performance, such as poorer sand suspension properties, for example. Any bactericides known in the art are suitable. An artisan of ordinary skill with the benefit of this disclosure will be able to identify a suitable bactericide and the proper concentration of such bactericide for a given application. Where used, such bactericides are present in the brine in an amount sufficient to destroy all bacteria that may be present in the brine. Examples of suitable bactericides include a 2,2-dibromo-3-nitrilopropionamide, commercially available under the tradename "BE-3S" from Halliburton Energy Services, Inc., of Duncan, Okla., and a 2-bromo-2-nitro-1, 3-propanediol commercially available under the tradename "BE-6" from Halliburton Energy Services, Inc., of Duncan, Okla. In one embodiment, the bactericides are present in the brine in an amount in the range of from about 0.001% to about 0.003% by weight of the brine. Another example of a suitable bactericide is a solution of sodium hypochlorite, commercially available under the tradename "CAT-1" from Halliburton Energy Services, Inc., of Duncan, Okla. Where used, such bactericide may be present in the brine in an amount in the range of from about 0.01% to about 0.1% by volume of the brine. When bactericides are used in the xanthan gels of the present invention, they generally are added to the brine before the xanthan polymer is added.

The xanthan gels of the present invention generally may be prepared according to the following process. First, a brine having a desired density is prepared. Such brine may comprise sea water, or a solution of, inter alia, fresh water, surface water, formation water or mixtures thereof to which a salt has been added. Where the water source contains divalent or trivalent cations, or where the salt used may contain divalent or trivalent cations, e.g., as impurities, in such concentrations as to be problematic, such divalent or trivalent cations are preferably removed by a process such as, inter alia, reverse osmosis or pH elevation. Second, a pH suppressant is added to suppress the pH of the brine to a desired level. At this time, bactericides may be added to the brine, if desired. Preferably, the brine is heated to a desired temperature at this time. The pH of the heated brine, if it has not been suppressed to a desired pH by the presence of the chelating agent, is then depressed to the desired pH by the addition of an acid. Next, xanthan polymer is added to the heated brine, accompanied by mild agitation, to form a mixture. The pH of the mixture is then elevated to a desired level by the addition of a base. The resultant mixture is then sheared at a desired rate of shear for a period of time to form a xanthan gel. Optionally, the xanthan gel may be substantially filtered through a filter having a mesh size in the range of less than about 20 microns. Optionally, surfactants may be added to the xanthan gel, if desired.

In another embodiment, the xanthan gels of the present invention are prepared according to the following process. First, a brine having a desired density is prepared. Such brine may comprise sea water, or a solution of, inter alia, fresh water, surface water, formation water or mixtures thereof to which a salt has been added. Where the water source contains divalent or trivalent cations, or where the salt used may contain divalent or trivalent cations, e.g., as impurities, in such concentrations as to be problematic, such divalent or trivalent cations are preferably removed by a process such as, inter alia, reverse osmosis or pH elevation. Second, a pH suppressant is added to suppress the pH of the brine to a desired level. At this time, bactericides may be added to the brine, if desired. Next, xanthan polymer is added to the brine, accompanied by mild agitation, to form a mixture. The pH of the mixture is then elevated to a desired level by the addition of a base. The mixture is then sheared for a period of time, during which period sufficient heat is imparted to the mixture to achieve a desired level of hydration of the xanthan polymer, to form the xanthan gel. Such heat is imparted by, inter alia, application of heat to the mixture, the use of a method of shearing that imparts the desired quantity of heat to the mixture, or a combination of such. Optionally, the xanthan gel may be filtered. Optionally, surfactants may be added to the xanthan gel, if desired.

As described above, to achieve the benefits of the present invention, heat is imparted to either the brine used in the present invention or to the mixture formed when xanthan polymer is added to the brine because, inter alia, such heating has been found to improve the hydration of the xanthan polymer. Preferably, heat is imparted to the brine. Generally, the brine may be heated to a temperature within the range of from about 110° F. to about 212° F. One of ordinary skill in the art with the benefit of this disclosure will recognize the appropriate temperature to which the brine may be heated while maintaining due regard for, inter alia, the safety of employees preparing the brine. In one embodiment, the brine is heated to a temperature within the range of from about 110° F. to about 130° F. Optionally, where the brine is not heated, the mixture of the unheated brine and the xanthan polymer may be heated by, inter alia, heating the mixture, shearing the mixture using a method of shearing that imparts a quantity of heat to the mixture sufficient to achieve a desired level of hydration of the xanthan polymer, or by a combination of such shearing and such heating. One of ordinary skill in the art with the benefit of this disclosure will recognize the quantity of heat required to achieve the desired level of hydration of the xanthan polymer, and whether such heat is optimally imparted by shearing, application of heat to the mixture, or a combination of both.

One of ordinary skill in the art with the benefit of this disclosure will recognize the appropriate rate of shearing as well as the appropriate length of time that the xanthan gels of the present invention must be sheared for a particular application. In one embodiment, the xanthan gel is sheared for ten minutes at 12,000 rpm using a laboratory Waring Blender-type mixer.

The gravel pack fluids of the present invention generally comprise a xanthan gel of the present invention, gravel and a breaker. The xanthan gel is present in the gravel pack fluid in an amount sufficient to adequately suspend the proppant. The gravel is present in the gravel pack fluid in an amount sufficient to form an effective gravel pack of the formation. Most known breakers having a usable temperature range from about ambient temperature to about 250° F. are suitable for use in the gravel packs of the present invention. As referred to herein, "usable temperature range" will be understood to mean a range of temperatures at which the breaker will function as intended. Examples of such suitable breakers include, inter alia, sodium chlorite, hypochlorite, perborate, persulfates, peroxides, including organic peroxides. The breaker is present in the gravel pack fluid in an amount sufficient to achieve recovery of the gravel pack fluid lost to the formation. An artisan of ordinary skill with the benefit of this disclosure will be able to identify a suitable breaker and the proper concentration of such breaker in the gravel pack for a given application. Optionally, the gravel pack fluid may contain an activator to, inter alia, optimize the break rate provided by the breaker. Any known activator is suitable for use in the gravel packs of the present invention. Examples of such suitable activators include, inter alia, chelated iron, copper, cobalt, and reducing sugars. An artisan of ordinary skill with the benefit of this disclosure will be able to identify a suitable activator and the proper concentration of such activator for a given application.

One embodiment of a method of forming the xanthan gels of the present invention comprises the steps of providing a brine comprising water, a salt and a chelating agent; optionally adding a bactericide; heating the brine; depressing the pH of the brine; introducing xanthan polymer into the heated brine to form a mixture; elevating the pH of the mixture; shearing the mixture to form a xanthan gel; optionally filtering the xanthan gel; optionally adding a surfactant; and placing the xanthan gel in a well bore. An example of a xanthan gel prepared by such method comprises 446.55 mL of fresh water, 0.009 grams of BE-3S bactericide, 0.009 grams BE-6 bactericide, 0.47 grams of FE-2 chelating agent, 58.2 grams potassium chloride, 65.22 grams of sodium bromide, 0.25 mL of 20 degrees Baumé HCl, 3.6 grams of xanthan polymer, 2.7 mL of MO-67 base, and 10.0 mL of NEA-96M non-emulsifier.

Another embodiment of a method of the present invention comprises the steps of providing a brine comprising water, a salt and a chelating agent; depressing the pH of the brine; introducing xanthan polymer into the brine to form a mixture; elevating the pH of the mixture; simultaneously shearing and imparting heat to the mixture to form a xanthan gel; optionally filtering the xanthan gel; and placing the xanthan gel in a well bore. An example of a xanthan gel prepared by such method comprises 500 mL of 9.4 ppg potassium chloride brine, 0.47 grams anhydrous citric acid, 0.25 mL of 20 degrees Baumé hydrochloric acid, 3.6 grams of xanthan polymer, 2.7 mL of MO-67, and 10 mL NEA-96M non-emulsifier.

One embodiment of a method of forming the gravel packing fluid of the present invention comprises forming a xanthan gel of the present invention; adding gravel and a breaker; optionally adding an activator; and placing the gravel pack in a well bore. An example of a gravel pack prepared by such method comprises 0.63% xanthan gel by weight of the gravel pack fluid.

To facilitate a better understanding of the present invention, the following examples of some of the preferred embodiments are given. In no way should such examples be read to limit the scope of the invention.

EXAMPLE 1

A brine was prepared consisting of 446.55 mL of fresh water, 0.009 grams of BE-3S bactericide, 0.009 grams BE-6 bactericide, 0.47 grams of FE-2 chelating agent, 58.2 grams potassium chloride, and 65.22 grams of sodium bromide. The brine was then heated in a water bath to a desired temperature.

Once the water bath reached the desired temperature, 0.25 mL of 20 degrees Baumé HCl was added. Next, 3.6 grams of xanthan polymer was added, followed by 2.7 mL of MO-67 base.

The resulting mixture was then sheared on a Waring Commercial blender model 31BL41 for 2 minutes at the blender's maximum rate. After shearing, the finished gel was completed by the addition of 10.0 mL of NEA-96M non-emulsifier.

About 250 mL of the finished gel was placed in a drilling fluid filter press. A Whatman Number 50 filter paper was used as the filtering medium. Approximately 110 psi differential pressure was applied to pressure the fluid through the filter press. Both the time required for complete filtration of the fluid, and the appearance of the filter paper at the end of the test, were recorded. This process was repeated four more times, at different temperatures. The results are reported in Table 1 below.

TABLE 1

| Temperature of Gel (° F.) | Time (Minutes:Seconds) | Appearance of Filter Paper |
|---|---|---|
| 132.8 | 0:55 | All fluid passed through the filter paper. No apparent polymer residue layer on the filter paper. |
| 127.5 | 0:52 | All fluid passed through the filter paper. No apparent polymer residue layer on the filter paper. |
| 118.7 | 5:00 | Only 235 mL passed through the filter paper in 5 minutes. Thin polymer residue layer on filter paper. |
| 112.6 | 2:30 | All fluid passed through the filter paper. |
| 101.5 | 5:00 | Only 190 mL passed through the filter paper in 5 minute. Thin polymer residue layer on filter paper. |

The data in Table 1 demonstrates the effect of applying heat to the brines used in the xanthan gels of the present invention during their formation.

EXAMPLE 2

Sample Composition No. 1 was prepared by combining 500 mL of 9.4 ppg potassium chloride brine, 0.47 grams anhydrous citric acid, 0.25 mL of 20 degrees Baumé hydrochloric acid, 3.6 grams of xanthan polymer, and 2.7 mL of MO-67. The sample was prepared in a blender jar. The sample was agitated slightly while the citric acid and hydrochloric acid were added, at a speed sufficient to move the fluid without entraining air. The blending speed was increased while the xanthan was added, with care being taken to observe that neither fisheyes nor lumps were present. After the MO-67 was added, the initial temperature was measured with a digital thermometer and recorded. Next, the blender jar was covered, and a stopwatch was started simultaneously while the speed was quickly accelerated to a preset setting of 12,000 rpm. The sample was stirred for exactly ten minutes. Then, the speed was decreased, and 10 mL NEA-96M non-emulsifier was slowly added. The final temperature was measured and recorded. It is noteworthy that the temperature of the sample rose during mixing. While still at temperature, the apparent viscosity of the sample was measured on a Model 35A Fann viscometer, B1 bob, S1 sleeve, F1 spring, at 300 rpm. The fluid was then cooled to approximately 85° F. before being filtered.

Sample Composition No. 2 was prepared and tested in exactly the same manner as Sample Composition No. 1, except that 8.64 grams XANVIS L was added instead of 3.6 grams of dry xanthan polymer. The results of this experiment are reported in Table 2 below.

TABLE 2

| Fluid | Initial Temp (° F.) | Final Temp (° F.) | Viscometer Dial Reading | Filtration Time (min:sec) |
|---|---|---|---|---|
| Sample Composition No. 1 | 73.5 | 127.7 | 44.5 cP at 127.7° F. | 0:32 |
| Sample Composition No. 2 | 73.5 | 127.2 | 63.5 cP at 127.2° F. | 0:26 |

The experiment reported in Example 2 was intended to identify whether high shear alone, without heating of the xanthan gel during its formation, would produce an easily filterable xanthan gel. Table 2 illustrates that the temperature of the samples in Example 2 rose during mixing. Accordingly, the results in Table 2 demonstrate that the elevation of the temperature of an unfinished xanthan gel beneficially affects filtration of the xanthan gel.

EXAMPLE 3

Sample Composition No. 3 was prepared by combining 500 mL of 9.4 ppg potassium chloride brine, 0.47 grams anhydrous citric acid, 0.25 mL of 20 degrees Baumé hydrochloric acid, 3.6 grams of xanthan polymer, and 2.7 mL of MO-67. The sample was prepared in a blender jar. The sample was agitated slightly while the citric acid and hydrochloric acid were added, at a speed sufficient to move the fluid without entraining air. The blending speed was increased while the xanthan was added to fully disperse the polymer. After the MO-67 was added, the initial temperature was measured with a digital thermometer and recorded. Next, the blender jar was covered, and a stopwatch was started simultaneously while the speed was quickly accelerated to a preset setting of 12,000 rpm. The sample was stirred for exactly two minutes. Then, the blender was stopped, the temperature was measured and recorded, and the sample was removed from the blender and cooled in an ice bath to room temperature. Once cooled to room temperature, the sample was returned to the blender, and the two minute cycle of stirring at 12,000 rpm, cooling to room temperature was repeated four more times until the full ten minutes of high shear was completed. Then, the blender speed was decreased, and 10 mL NEA-96M surfactant was slowly added. The final temperature was measured and recorded. While still at temperature, the apparent viscosity of the sample was measured on a Model 35A Fann viscometer, B1 bob, S1 sleeve, F1 spring, at 300 rpm. The fluid was then cooled to approximately 85° F. before being filtered.

Sample Composition No. 4 was prepared and tested in exactly the same manner as Sample Composition No. 3, except that 8.64 grams XANVIS L was added instead of 3.6 grams of dry xanthan polymer. The results of this experiment are reported in Tables 3 and 4 below.

TABLE 3

| | Fluid | | | |
|---|---|---|---|---|
| | Sample Composition No. 3 | | Sample Composition No. 4 | |
| Time Increments (Minutes) | Initial Temp ° F. | Final Temp ° F. | Initial Temp ° F. | Final Temp ° F. |
| 0–2 | 74.4 | 85.7 | 74.8 | 87.2 |
| 2–4 | 74.8 | 79.6 | 75.1 | 81.2 |
| 4–6 | 74.9 | 81.0 | 74.7 | 81.1 |
| 6–8 | 74.6 | 80.2 | 73.0 | 81.4 |
| 8–10 | 74.2 | 80.9 | 74.3 | 80.4 |

TABLE 4

| Fluid | Viscometer Dial Reading | Filtration Time (min:sec) | Appearance of Filter Paper |
|---|---|---|---|
| Sample Composition No. 3 | 44.5 cP at 75.5° F. | 4:20 | Thin filter cake on filter paper. |
| Sample Composition No. 4 | 48.5 cP at 75.6° F. | 5:00 | Only 180 mL passed through filter. Thin film on filter paper. |

Thus, Example 3 demonstrates that high shear by itself is insufficient to provide an easily filterable xanthan gel, without heating of the xanthan gel during its formation.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of mixing xanthan polymer in a brine comprising the steps of:
   providing a brine comprising water, a salt and a pH suppressant;
   heating the brine;
   adding xanthan polymer to the brine to form a mixture;
   elevating the pH of the mixture; and
   mixing the mixture to form a xanthan gel.

2. The method of claim 1 wherein the water comprises fresh water.

3. The method of claim 1 wherein the salt comprises monovalent salts.

4. The method of claim 3 wherein the salt comprises potassium chloride, sodium bromide, ammonium chloride, cesium formate, potassium formate, sodium formate, sodium nitrate, and sodium chloride, or a mixture thereof.

5. The method of claim 1 wherein the brine is heated to a temperature in the range of from about 110° F. to about 212° F.

6. The method of claim 1 wherein the pH suppressant suppresses the pH of the brine to a pH in the range of from about 1 to about 6.

7. The method of claim 1 wherein the pH suppressant is an acid.

8. The method of claim 7 wherein the acid comprises hydrochloric acid, acetic acid, formic acid, or citric acid.

9. The method of claim 1 wherein the pH suppressant is a chelating agent.

10. The method of claim 9 wherein the chelating agent is an acid.

11. The method of claim 10 wherein the chelating agent is citric acid, nitrilotriacetic acid, or an acid form of EDTA.

12. The method of claim 9 wherein the brine further comprises free iron.

13. The method of claim 12 wherein the chelating agent is present in an amount sufficient to prevent crosslinking of the xanthan polymer by the free iron.

14. The method of claim 9 wherein the chelating agent is present in the brine in an amount in the range of from about 0.02% to about 0.5% by weight of the brine.

15. The method of claim 1 wherein the pH suppressant is a combination of an acid and a chelating agent.

16. The method of claim 15 wherein the chelating agent is present in the brine in an amount in the range of from about 0.02% to about 0.5% by weight of the brine.

17. The method of claim 1 wherein the xanthan polymer comprises dry xanthan polymer or xanthan polymer dispersed in a hydrocarbon solution.

18. The method of claim 1 wherein the xanthan polymer is of a high purity.

19. The method of claim 1 wherein the brine further comprises a bactericide or a surfactant.

20. The method of claim 19 wherein the bactericide is present in the brine in an amount sufficient to destroy all bacteria present in the brine.

21. The method of claim 19 wherein the bactericide is present in the brine in an amount in the range of from about 0.001% to about 0.003% by weight of the brine.

22. The method of claim 19 wherein the surfactant is present in the xanthan gel in an amount sufficient to prevent incompatibility with formation fluids or well bore fluids.

23. The method of claim 19 wherein the surfactant is present in the xanthan gel in an amount in the range of from about 0.01% to about 5.0% by volume.

24. The method of claim 1 wherein the pH of the mixture is elevated by the addition of a base.

25. The method of claim 24 wherein the pH is elevated to above about 7.

26. The method of claim 24 wherein the base comprises sodium hydroxide, potassium carbonate, potassium hydroxide or sodium carbonate.

27. The method of claim 1 wherein the density of the xanthan gel is in the range of from about 8.4 lb/gallon to about 20.5 lb/gallon.

28. The method of claim 1 wherein the mixing comprises shearing the mixture.

29. The method of claim 1 wherein the xanthan gel can be filtered through a filter having a mesh size less than about 20 microns.

30. The method of claim 1 wherein the brine comprises fresh water, potassium chloride, sodium bromide, citric acid and hydrochloric acid, wherein the brine is heated to a temperature in the range of from about 110° F. to about 130° F., wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

31. The method of claim 1 wherein the brine comprises fresh water, potassium chloride, sodium bromide, citric acid, hydrochloric acid and a bactericide, wherein the brine is heated to a temperature in the range of from about 110° F. to about 130° F., wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

32. The method of claim 1 wherein the brine comprises fresh water, potassium chloride, sodium bromide, hydrochloric acid and citric acid, wherein the brine is heated to a temperature in the range of from about 110° F. to about 130° F., wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 20 microns.

33. A method of mixing xanthan polymer in a brine comprising the steps of:
   providing a brine comprising water, a salt and a pH suppressant;
   adding xanthan polymer to the brine to form a mixture;
   elevating the pH of the mixture; and
   mixing the mixture; and
   imparting heat to the mixture while mixing to form a xanthan gel.

34. The method of claim 33 wherein the water comprises fresh water.

35. The method of claim 33 wherein the salt comprises monovalent salts.

36. The method of claim 35 wherein the salt comprises potassium chloride, sodium bromide, ammonium chloride, cesium formate, potassium formate, sodium formate, sodium nitrate, and sodium chloride, or a mixture thereof.

37. The method of claim 33 wherein the pH suppressant suppresses the pH of the brine to a pH in the range of from about 1 to about 6.

38. The method of claim 33 wherein the pH suppressant is an acid.

39. The method of claim 33 wherein the acid comprises hydrochloric acid, acetic acid, formic acid, or citric acid.

40. The method of claim 33 wherein the pH suppressant is a chelating agent.

41. The method of claim 40 wherein the chelating agent is an acid.

42. The method of claim 41 wherein the chelating agent is citric acid, nitrilotriacetic acid, or an acid form of EDTA.

43. The method of claim 41 wherein the brine comprises free iron.

44. The method of claim 41 wherein the chelating agent is present in the brine in an amount sufficient to prevent crosslinking of the xanthan polymer by the free iron.

45. The method of claim 40 wherein the chelating agent is present in the brine in an amount in the range of from about 0.02% to about 0.5% by weight of the brine.

46. The method of claim 33 wherein the pH suppressant is a combination of an acid and a chelating agent.

47. The method of claim 46 wherein the chelating agent is present in the brine in an amount in the range of from about 0.02% to about 0.5% by weight of the brine.

48. The method of claim 33 wherein the xanthan polymer comprises dry xanthan polymer or xanthan polymer dispersed in a hydrocarbon solution.

49. The method of claim 33 wherein the xanthan polymer is of a high purity.

50. The method of claim 33 wherein the brine further comprises a bactericide or a surfactant.

51. The method of claim 50 wherein the bactericide is present in the brine in an amount sufficient to destroy all bacteria present in the brine.

52. The method of claim 50 wherein the bactericide is present in the brine in an amount in the range of from about 0.001% to about 0.003% by weight of the brine.

53. The method of claim 50 wherein the surfactant is present in the xanthan gel in an amount sufficient to prevent incompatibility with formation fluids or well bore fluids.

54. The method of claim 50 wherein the surfactant is present in the xanthan gel in an amount in the range of from about 0.01% to about 5.0% by volume.

55. The method of claim 33 wherein the pH of the mixture is elevated by the addition of a base.

56. The method of claim 55 wherein the pH is elevated to above about 7.

57. The method of claim 55 wherein the base comprises sodium hydroxide, potassium carbonate, potassium hydroxide or sodium carbonate.

58. The method of claim 33 wherein the density of the xanthan gel is in the range of from about 8.4 lb/gallon to about 20.5 lb/gallon.

59. The method of claim 33 wherein the mixing comprises shearing the mixture.

60. The method of claim 33 wherein imparting heat to the mixture while mixing comprises adding heat to the mixture.

61. The method of claim 33 wherein imparting heat to the mixture while mixing comprises using a method of shearing that imparts heat to the mixture being sheared.

62. The method of claim 33 wherein the brine comprises fresh water, potassium chloride, sodium bromide, citric acid and hydrochloric acid, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

63. The method of claim 33 wherein the brine comprises fresh water, potassium chloride, sodium bromide, citric acid, hydrochloric acid and a bactericide, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

64. The method of claim 33 wherein the brine comprises fresh water, potassium chloride, sodium bromide, hydrochloric acid and citric acid, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 20 microns.

65. A method of hydrating xanthan polymer in a brine solution comprising the steps of:
providing a brine comprising water, a salt and a pH suppressant;
heating the brine;
adding xanthan polymer to the brine to form a mixture;
elevating the pH of the mixture; and
mixing the mixture to form a xanthan gel.

66. The method of claim 65 wherein the water comprises fresh water.

67. The method of claim 65 wherein the salt comprises monovalent salts.

68. The method of claim 67 wherein the salt comprises potassium chloride, sodium bromide, ammonium chloride, cesium formate, potassium formate, sodium formate, sodium nitrate, and sodium chloride, or a mixture thereof.

69. The method of claim 65 wherein the brine is heated to a temperature in the range of from about 110° F. to about 212° F.

70. The method of claim 65 wherein the pH suppressant suppresses the pH of the brine to a pH in the range of from about 1 to about 6.

71. The method of claim 65 wherein the pH suppressant is an acid.

72. The method of claim 71 wherein the acid comprises hydrochloric acid, acetic acid, formic acid, or citric acid.

73. The method of claim 65 wherein the pH suppressant is a chelating agent.

74. The method of claim 73 wherein the chelating agent is an acid.

75. The method of claim 74 wherein the chelating agent is citric acid, nitrilotriacetic acid, or an acid form of EDTA.

76. The method of claim 73 wherein the brine comprises free iron.

77. The method of claim 73 wherein the chelating agent is present in the brine in an amount sufficient to prevent crosslinking of the xanthan polymer by the free iron.

78. The method of claim 73 wherein the chelating agent is present in the brine in an amount in the range of from about 0.02% to about 0.5% by weight of the brine.

79. The method of claim 65 wherein the pH suppressant is a combination of an acid and a chelating agent.

80. The method of claim 79 wherein the chelating agent is present in the brine in an amount in the range of from about 0.02% to about 0.5% by weight of the brine.

81. The method of claim 65 wherein the xanthan polymer comprises dry xanthan polymer or xanthan polymer dispersed in a hydrocarbon solution.

82. The method of claim 65 wherein the xanthan polymer is of a high purity.

83. The method of claim 65 wherein the brine further comprises a bactericide or a surfactant.

84. The method of claim 83 wherein the bactericide is present in the brine in an amount sufficient to destroy all bacteria present in the brine.

85. The method of claim 83 wherein the bactericide is present in the brine in an amount in the range of from about 0.001% to about 0.003% by weight of the brine.

86. The method of claim 83 wherein the surfactant is present in the xanthan gel in an amount sufficient to prevent incompatibility with formation fluids or well bore fluids.

87. The method of claim 83 wherein the surfactant is present in the xanthan gel in an amount in the range of from about 0.01% to about 5.0% by volume.

88. The method of claim 65 wherein the pH of the mixture is elevated by the addition of a base.

89. The method of claim 88 wherein the pH is elevated to above about 7.

90. The method of claim 88 wherein the base comprises sodium hydroxide, potassium carbonate, potassium hydroxide or sodium carbonate.

91. The method of claim 65 wherein the density of the xanthan gel is in the range of from about 8.4 lb/gallon to about 20.5 lb/gallon.

92. The method of claim 65 wherein the mixing comprises shearing the mixture.

93. The method of claim 65 wherein the xanthan gel can be filtered through a filter having a mesh size less than about 20 microns.

94. The method of claim 65 wherein hydrating the xanthan polymer comprises fully hydrating the xanthan polymer.

95. The method of claim 65 wherein the brine comprises fresh water, potassium chloride, sodium bromide, citric acid and hydrochloric acid, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

96. The method of claim 65 wherein the brine comprises fresh water, potassium chloride, sodium bromide, citric acid, hydrochloric acid and a bactericide, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

97. The method of claim 65 wherein the brine comprises fresh water, potassium chloride, sodium bromide, hydrochloric acid and citric acid, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 20 microns.

98. A method of hydrating xanthan polymer in a brine solution comprising the steps of:
  providing a brine comprising water, a salt and a pH suppressant;
  adding xanthan polymer to the brine to form a mixture;
  elevating the pH of the mixture; and
  mixing the mixture; and
  imparting heat to the mixture while mixing to form a xanthan gel.

99. The method of claim 98 wherein the water comprises fresh water.

100. The method of claim 98 wherein the salt comprises monovalent salts.

101. The method of claim 100 wherein the salt comprises potassium chloride, sodium bromide, ammonium chloride, cesium formate, potassium formate, sodium formate, sodium nitrate, and sodium chloride, or a mixture thereof.

102. The method of claim 98 wherein the pH suppressant suppresses the pH of the brine to a pH in the range of from about 1 to about 6.

103. The method of claim 98 wherein the pH suppressant is an acid.

104. The method of claim 98 wherein the acid comprises hydrochloric acid, acetic acid, formic acid, or citric acid.

105. The method of claim 98 wherein the pH suppressant is a chelating agent.

106. The method of claim 105 wherein the chelating agent is an acid.

107. The method of claim 106 wherein the chelating agent is citric acid, nitrilotriacetic acid, or an acid form of EDTA.

108. The method of claim 105 wherein the brine further comprises free iron.

109. The method of claim 108 wherein the chelating agent is present in the brine in an amount sufficient to prevent crosslinking of the xanthan polymer by the free iron.

110. The method of claim 105 wherein the chelating agent is present in the brine in an amount in the range of from about 0.02% to about 0.5% by weight of the brine.

111. The method of claim 98 wherein the pH suppressant is a combination of an acid and a chelating agent.

112. The method of claim 111 wherein the chelating agent is present in the brine in an amount in the range of from about 0.02% to about 0.5% by weight of the brine.

113. The method of claim 98 wherein the xanthan polymer comprises dry xanthan polymer or xanthan polymer dispersed in a hydrocarbon solution.

114. The method of claim 98 wherein the xanthan polymer is of a high purity.

115. The method of claim 98 wherein the brine further comprises a bactericide or a surfactant.

116. The method of claim 115 wherein the bactericide is present in the brine in an amount sufficient to destroy all bacteria present in the brine.

117. The method of claim 115 wherein the bactericide is present in the brine in an amount in the range of from about 0.001% to about 0.003% by weight of the brine.

118. The method of claim 115 wherein the surfactant is present in the xanthan gel in an amount sufficient to prevent incompatibility with formation fluids or well bore fluids.

119. The method of claim 115 wherein the surfactant is present in the xanthan gel in an amount in the range of from about 0.01% to about 5.0% by volume.

120. The method of claim 98 wherein the pH of the mixture is elevated by the addition of a base.

121. The method of claim 120 wherein the pH is elevated to above about 7.

122. The method of claim 120 wherein the base comprises sodium hydroxide, potassium carbonate, potassium hydroxide or sodium carbonate.

123. The method of claim 98 wherein the density of the xanthan gel is in the range of from about 8.4 lb/gallon to about 20.5 lb/gallon.

124. The method of claim 98 wherein the mixing comprises shearing the mixture.

125. The method of claim 98 wherein imparting heat to the mixture while mixing comprises adding heat to the mixture.

126. The method of claim 98 wherein imparting heat to the mixture while mixing comprises using a method of shearing that imparts heat to the mixture being sheared.

127. The method of claim 98 wherein hydrating the xanthan polymer comprises fully hydrating the xanthan polymer.

128. The method of claim 98 wherein the brine comprises fresh water, potassium chloride, sodium bromide, citric acid and hydrochloric acid, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

129. The method of claim 98 wherein the brine comprises fresh water, potassium chloride, sodium bromide, citric acid, hydrochloric acid and a bactericide, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

130. The method of claim 98 wherein the brine comprises fresh water, potassium chloride, sodium bromide, hydrochloric acid and citric acid, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 20 microns.

131. A method of gravel packing a subterranean formation comprising the steps of:
providing a gravel pack fluid comprising gravel, a breaker, and a xanthan gel, the gel made from a process comprising the steps of
providing a brine comprising water, a salt and a pH suppressant;
heating the brine;
adding xanthan polymer to the brine to form a mixture;
elevating the pH of the mixture; and
mixing the mixture to form a xanthan gel; and
placing the gravel pack fluid in a subterranean formation.

132. The method of claim 131 wherein the water comprises fresh water.

133. The method of claim 131 wherein the salt comprises monovalent salts.

134. The method of claim 133 wherein the salt comprises potassium chloride, sodium bromide, ammonium chloride, cesium formate, potassium formate, sodium formate, sodium nitrate, and sodium chloride, or a mixture thereof.

135. The method of claim 131 wherein the brine is heated to a temperature in the range of from about 110° F. to about 212° F.

136. The method of claim 131 wherein the pH suppressant suppresses the pH of the brine to a pH in the range of from about 1 to about 6.

137. The method of claim 131 wherein the pH suppressant is an acid.

138. The method of claim 137 wherein the acid comprises hydrochloric acid, acetic acid, formic acid, or citric acid.

139. The method of claim 131 wherein the pH suppressant is a chelating agent.

140. The method of claim 139 wherein the chelating agent is an acid.

141. The method of claim 140 wherein the chelating agent is citric acid, nitrilotriacetic acid, or an acid form of EDTA.

142. The method of claim 139 wherein the brine comprises free iron.

143. The method of claim 142 wherein the chelating agent is present in the brine in an amount sufficient to prevent crosslinking of the xanthan polymer by the free iron.

144. The method of claim 139 wherein the chelating agent is present in the brine in an amount in the range of from about 0.02% to about 0.5% by weight of the brine.

145. The method of claim 131 wherein the pH suppressant is a combination of an acid and a chelating agent.

146. The method of claim 145 wherein the chelating agent is present in the brine in an amount in the range of from about 0.02% to about 0.5% by weight of the brine.

147. The method of claim 131 wherein the xanthan polymer comprises dry xanthan polymer or xanthan polymer dispersed in a hydrocarbon solution.

148. The method of claim 131 wherein the xanthan polymer is of a high purity.

149. The method of claim 131 wherein the brine further comprises a bactericide or a surfactant.

150. The method of claim 149 wherein the bactericide is present in the brine in an amount sufficient to destroy all bacteria present in the brine.

151. The method of claim 149 wherein the bactericide is present in the brine in an amount in the range of from about 0.001% to about 0.003% by weight of the brine.

152. The method of claim 149 wherein the surfactant is present in the xanthan gel in an amount sufficient to prevent incompatibility with formation fluids or well bore fluids.

153. The method of claim 149 wherein the surfactant is present in the xanthan gel in an amount in the range of from about 0.01% to about 5.0% by volume.

154. The method of claim 131 wherein the pH of the mixture is elevated by the addition of a base.

155. The method of claim 154 wherein the pH is elevated to above about 7.

156. The method of claim 154 wherein the base comprises sodium hydroxide, potassium carbonate, potassium hydroxide or sodium carbonate.

157. The method of claim 131 wherein the density of the xanthan gel is in the range of from about 8.4 lb/gallon to about 20.5 lb/gallon.

158. The method of claim 131 wherein the mixing comprises shearing the mixture.

159. The method of claim 131 wherein the xanthan gel can be filtered through a filter having a mesh size less than about 20 microns.

160. The method of claim 131 wherein the xanthan gel is present in the gravel pack fluid in an amount sufficient to adequately suspend the proppant.

161. The method of claim 131 wherein the breaker is present in the gravel pack fluid in an amount sufficient to achieve recovery of the gravel pack fluid lost to the formation.

162. The method of claim 131 wherein the gravel is present in the gravel pack fluid in an amount sufficient to form an effective gravel pack of the formation.

163. The method of claim 131 wherein the breaker is sodium chlorite, hypochlorite, perborate, persulfates, peroxide, or an organic peroxide.

164. The method of claim 131 wherein the gravel pack fluid further comprises an activator.

165. The method of claim 164 wherein the activator is present in the gravel pack fluid in an amount sufficient to optimize the break rate provided by the breaker.

166. The method of claim 164 wherein the activator is chelated iron, copper, cobalt, or a reducing sugar.

167. The method of claim 131 wherein the brine comprises fresh water, potassium chloride, sodium bromide, citric acid and hydrochloric acid, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

168. The method of claim 131 wherein the brine comprises fresh water, potassium chloride, sodium bromide, citric acid, hydrochloric acid, and a bactericide, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

169. The method of claim 131 wherein the brine comprises fresh water, potassium chloride, sodium bromide, hydrochloric acid and citric acid, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 5 microns.

170. The method of claim 131 wherein the brine comprises fresh water, potassium chloride, sodium bromide, hydrochloric acid and citric acid, wherein the brine is heated to a temperature in the range of from about 110 F to about 130 F, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, wherein the xanthan gel can be filtered through a filter having a mesh size of less than about 5 microns, and wherein the breaker comprises sodium persulfate or an organic peroxide.

171. A method of gravel packing a subterranean formation comprising the steps of:
    providing a gravel pack fluid comprising gravel, a breaker, and a xanthan gel, the gel made from a process comprising the steps of
    providing a brine comprising water, a salt and a pH suppressant;
    adding xanthan polymer to the brine to form a mixture;
    elevating the pH of the mixture; and
    mixing the mixture; and
    imparting heat to the mixture while mixing to form a xanthan gel; and
    placing the gravel pack fluid in a subterranean formation.

172. The method of claim 171 wherein the water comprises fresh water.

173. The method of claim 171 wherein the salt comprises monovalent salts.

174. The method of claim 173 wherein the salt comprises potassium chloride, sodium bromide, ammonium chloride, cesium formate, potassium formate, sodium formate, sodium nitrate, and sodium chloride, or a mixture thereof.

175. The method of claim 171 wherein the pH suppressant suppresses the pH of the brine to a pH in the range of from about 1 to about 6.

176. The method of claim 171 wherein the pH suppressant is an acid.

177. The method of claim 176 wherein the acid comprises hydrochloric acid, acetic acid, formic acid, or citric acid.

178. The method of claim 171 wherein the pH suppressant is a chelating agent.

179. The method of claim 178 wherein the chelating agent is an acid.

180. The method of claim 179 wherein the chelating agent is citric acid, nitrilotriacetic acid, or an acid form of EDTA.

181. The method of claim 178 wherein the brine comprises free iron.

182. The method of claim 181 wherein the chelating agent is present in the brine in an amount sufficient to prevent crosslinking of the xanthan polymer by the free iron.

183. The method of claim 178 wherein the chelating agent is present in the brine in an amount in the range of from about 0.02% to about 0.5% by weight of the brine.

184. The method of claim 171 wherein the pH suppressant is a combination of an acid and a chelating agent.

185. The method of claim 184 wherein the chelating agent is present in the brine in an amount in the range of from about 0.02% to about 0.5% by weight of the brine.

186. The method of claim 171 wherein the xanthan polymer comprises dry xanthan polymer or xanthan polymer dispersed in a hydrocarbon solution.

187. The method of claim 171 wherein the xanthan polymer is of a high purity.

188. The method of claim 171 wherein the brine further comprises a bactericide or a surfactant.

189. The method of claim 188 wherein the bactericide is present in the brine in an amount sufficient to destroy all bacteria present in the brine.

190. The method of claim 188 wherein the bactericide is present in the brine in an amount in the range of from about 0.001% to about 0.003% by weight of the brine.

191. The method of claim 188 wherein the surfactant is present in the xanthan gel in an amount sufficient to prevent incompatibility with formation fluids or well bore fluids.

192. The method of claim 188 wherein the surfactant is present in the xanthan gel in an amount in the range of from about 0.01% to about 5.0% by volume.

193. The method of claim 171 wherein the pH of the mixture is elevated by the addition of a base.

194. The method of claim 193 wherein the pH is elevated to above about 7.

195. The method of claim 193 wherein the base comprises sodium hydroxide, potassium carbonate, potassium hydroxide or sodium carbonate.

196. The method of claim 171 wherein the density of the xanthan gel is in the range of from about 8.4 lb/gallon to about 20.5 lb/gallon.

197. The method of claim 171 wherein the mixing comprises shearing the mixture.

198. The method of claim 171 wherein imparting heat to the mixture while mixing comprises adding heat to the mixture.

199. The method of claim 171 wherein imparting heat to the mixture while mixing comprises using a method of shearing that imparts heat to the mixture being sheared.

200. The method of claim 171 wherein the xanthan gel can be filtered through a filter having a mesh size less than about 20 microns.

201. The method of claim 171 wherein the xanthan gel is present in the gravel pack fluid in an amount sufficient to adequately suspend the proppant.

202. The method of claim 171 wherein the breaker is present in the gravel pack fluid in an amount sufficient to achieve recovery of the gravel pack fluid lost to the formation.

203. The method of claim 171 wherein the gravel is present in the gravel pack fluid in an amount sufficient to form an effective gravel pack of the formation.

204. The method of claim 171 wherein the breaker is sodium chlorite, hypochlorite, perborate, persulfates, peroxide, or an organic peroxide.

205. The method of claim 171 wherein the gravel pack fluid further comprises an activator.

206. The method of claim 205 wherein the activator is present in the gravel pack fluid in an amount sufficient to optimize the break rate provided by the breaker.

207. The method of claim 205 wherein the activator further comprises chelated iron, copper, cobalt, or a reducing sugar.

208. The method of claim 171 wherein the brine comprises fresh water, potassium chloride, sodium bromide, citric acid and hydrochloric acid, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, and wherein the density of the xanthan gel is in the range of from about 8.4 lb/gallon to about 20.5 lb/gallon.

209. The method of claim 171 wherein the brine comprises fresh water, potassium chloride, sodium bromide, citric acid, hydrochloric acid and a bactericide, wherein the pH of the brine is in the range of about 1 to about 4, wherein the pH of the mixture is elevated after the addition of the xanthan polymer to a pH above 11 by the addition of sodium hydroxide, wherein the mixing is done by shearing the mixture, wherein the density of the xanthan gel is in the range of from about 8.4 lb/gallon to about 20.5 lb/gallon, and wherein the xanthan gel further comprises a surfactant.

210. The method of claim 171 wherein the brine comprises fresh water, potassium chloride, sodium bromide, hydrochloric acid and citric acid, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, and wherein the xanthan gel can be filtered through a filter having a mesh size of less than about 20 microns.

211. The method of claim 171 wherein the brine comprises fresh water, potassium chloride, sodium bromide, hydrochloric acid and citric acid, wherein the pH of the brine is in the range of about 1 to about 4, wherein the pH of the mixture is elevated after the addition of the xanthan polymer to a pH above 11 by the addition of sodium hydroxide, wherein the density of the xanthan gel is in the range of from about 8.4 lb/gallon to about 20.5 lb/gallon, wherein the xanthan gel can be filtered through a filter having a mesh size of less than about 20 microns, and wherein the breaker comprises sodium persulfate or an organic peroxide.

* * * * *